United States Patent [19]

Ahlsén et al.

[11] Patent Number: 4,787,801
[45] Date of Patent: Nov. 29, 1988

[54] TRANSPORT UNIT FOR FLEXIBLE ASSEMBLY SYSTEM

[75] Inventors: Bertil J. B. Ahlsén, Hinsdale, Ill.; Kurt J. Dahlstrom, Gothenburg, Sweden; Samuel J. Greshay, Jr., Horicon, Wis.; James F. Mathia, West Bend, Wis.; Wendell M. Hottmann, Cottage Grove, Wis.

[73] Assignee: Deere & Company, Moline, Ill.

[21] Appl. No.: 923,672

[22] Filed: Oct. 27, 1986

[51] Int. Cl.4 ............................................. B65H 1/00
[52] U.S. Cl. .................................. 414/222; 414/678; 29/430; 269/56
[58] Field of Search ............... 414/678, 222, 607; 180/167–169; 191/62; 104/279; 269/55, 56, 60; 29/429–431

[56] References Cited

U.S. PATENT DOCUMENTS

| | | | |
|---|---|---|---|
| 601,194 | 3/1898 | Zimmerman | 104/279 |
| 612,789 | 10/1898 | Reynolds | 104/279 |
| 1,812,585 | 6/1931 | Collins | 269/60 X |
| 2,997,292 | 8/1961 | Lucker et al. | 269/60 X |
| 3,087,631 | 4/1963 | Kocher | 414/678 |
| 3,270,901 | 9/1966 | Ord | 414/607 X |
| 3,667,564 | 6/1972 | Schnell | 180/168 |
| 3,789,768 | 2/1974 | Broz | 104/279 |
| 3,971,485 | 7/1976 | Hoppey | 414/607 X |
| 3,977,662 | 8/1976 | Cook | 269/60 |
| 4,137,984 | 2/1979 | Jennings et al. | 180/168 X |
| 4,144,981 | 3/1979 | Borgen | 414/607 |
| 4,599,034 | 7/1986 | Kennedy et al. | 414/678 |
| 4,618,306 | 10/1986 | Dorsch | 414/607 X |
| 4,645,412 | 2/1987 | Fujita et al. | 414/678 X |

FOREIGN PATENT DOCUMENTS 0169230 11/1959 Sweden .

Primary Examiner—Robert J. Spar
Assistant Examiner—Jennifer L. Doyle

[57] ABSTRACT

A transport unit usable in a flexible assembly system and comprising an automatic guided vehicle and a work carrier positioned to the rear thereof. The work carrier is of a U shape with a pair of spaced legs extending from a base and having free ends, each of which rotatably mount tooling for engaging opposite ends of a component of the device to be assembled. Drive mechanism is provided for elevation of the work carrier and rotation of the tooling to orient the component at a desired height and at a desired rotative position for ease of assembly of components thereto. The tooling on the work carrier rotates about an axis and engages a component of the device to be assembled whereby the rotative axis is close to the center of gravity of the device to be assembled to minimize the power requirements in rotation thereof. The transport unit has additional structural features facilitating assembly operations and safety of operation.

34 Claims, 7 Drawing Sheets

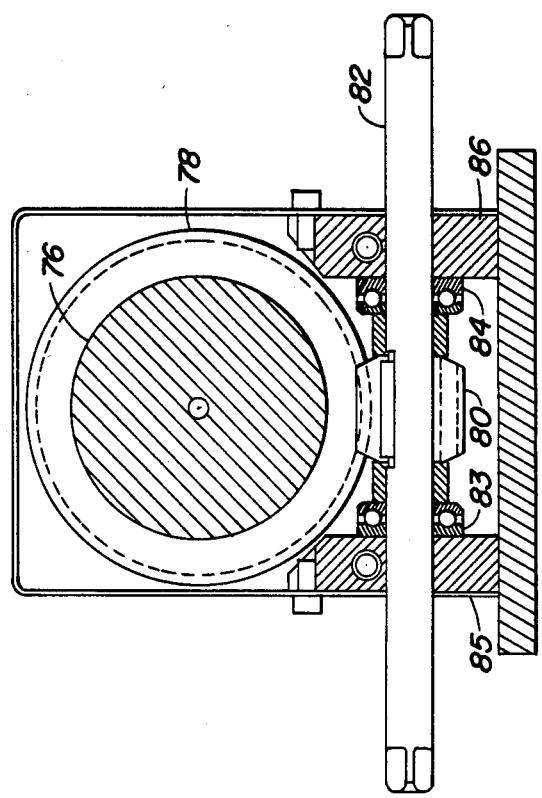
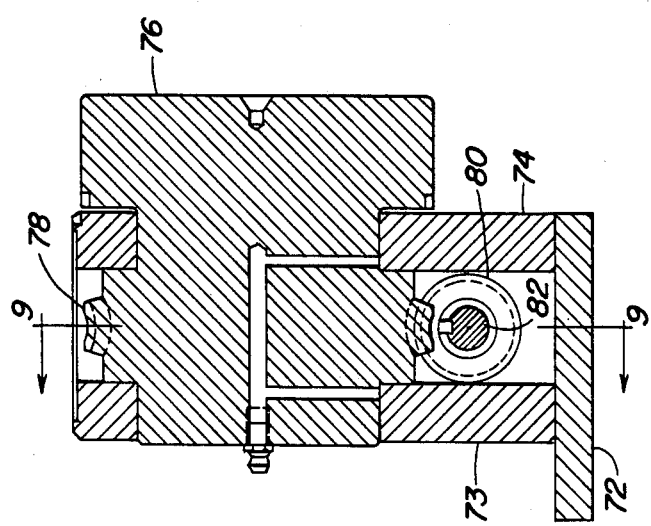
FIG. 9
FIG. 8

TRANSPORT UNIT FOR FLEXIBLE ASSEMBLY SYSTEM

DESCRIPTION

1. Field of the Invention

This invention relates to a transport unit for a flexible assembly system having an automatic guided vehicle and an associated work carrier that can move sequentially and selectively to a plurality of stations for sequential assembly of a device. A component of the device to be assembled is associated with the work carrier at an initial station and thereafter additional components are added to the assembly. The transport unit is constructed to enable the desired rotational and elevational positioning of the components and easy access thereto for performance of assembly operations.

A particular use of the transport unit is in a flexible assembly system for a lawn and garden tractor wherein a frame can be mounted on the work carrier and, with the frame in one rotative position, components, such as wheels, can be associated with the frame. In another rotative position, other components can be added with the rotative positioning of the assembled components being about an axis which is generally aligned with the center of gravity of the tractor to minimize the power required for rotative positioning.

2. Background of the Invention

Remotely-controlled automatic guided vehicles are increasingly being used in industry, with such vehicle being controllable either by a floor-mounted wire system or by radio command. An example of such an automatic guided vehicle is shown in Lindfors U.S. Pat. No. 4,344,498. The automatic guided vehicle is capable of movement through a plurality of stations and can move away from the floor-mounted guiding wire if necessary to reach a certain position or station and, thereafter, return to direct association with the wire. With such a structure, there is flexibility in the path that the automatic guided vehicle follows and it is not necessary for the vehicles to follow one after the other along a fixed path. This capability enables the vehicles to either move directly into a station or accumulate at various stations awaiting a further command.

The use of automatic guided vehicles in a motor vehicle assembly system is shown in the Karlsson U.S. Pat. No. 3,968,559 wherein the automatic guided vehicles have a superimposed trundle or rack for holding a vehicle component and which can be moved vertically as well as tipped. Another tipping device for a vehicle component is shown in Oksala et al. U.S. Pat. No. 3,923,296. The last two patents mentioned above do not disclose a flexible assembly system having maximum efficiency for assemblying certain products, such as a lawn and garden tractor, wherein the assembled product is built up completely from and by association of parts with a frame member of the device and which can assume various elevations and rotative positions for optimizing access thereto.

A transport car for motor assembly and having a readily accessible motor fixture with a rotatable index plate is shown in Perhed U.S. Pat. No. 4,023,639.

SUMMARY OF THE INVENTION

A primary feature of the invention is to provide a transport unit having floor-engaging wheels for use in a flexible assembly system wherein the transport unit can travel selectively and sequentially between a plurality of stations and which is composed of an automatic guided vehicle having the floor-engaging wheels and controllable to travel between stations and a work carrier associated with the automatic guided vehicle for holding a component of the device to which additional components are to be assembled at a plurality of the stations at various elevations and rotative positions. The automatic guided vehicle and the work carrier are of new and improved construction to permit easier access to a component held by the work carrier and association of the transport unit with mechanism, such as a take-off conveyor at a station, and with versatility in positioning of the component of the device for assembly operations derived from movement of the work carrier up and down as well as rotative positioning of the component about an axis passing through the device.

In carrying out the foregoing, the work carrier extends from the rear of the automatic guided vehicle and is of a U shape with a base and a pair of spaced legs each having a free end and extending from opposite ends of the base and rotatably mounting tooling. The tooling includes means for engaging ends of the component of the device to be assembled and is rotatable about an axis extending lengthwise of and parallel to the base and through the legs adjacent the free ends thereof whereby the component can be rotated about an axis which extends approximately through the center of gravity of the device to be assembled for ease of rotation thereof. This enables positioning of said component with one side facing either up or down or in any orientation therebetween.

The transport unit as described in the preceding paragraph has the work carrier supported on a vertically-movable narrow mast mounted on the automatic guided vehicle. The mast is located at the rear and between the sides of the automatic guided vehicle and mounts a relatively narrow work carrier which overlies a frame extending rearwardly from the lower rear end of the automatic guided vehicle. The frame has a width approximating that of the work carrier whereby the mast, work carrier and frame can be narrower than the component of the device supported by the work carrier to facilitate positioning at a station and with ready access to either side of the component by an assembler that can stand close to the transport unit and for unloading the completely assembled vehicle directly from the transport unit onto a split conveyor.

Additional structural features of the transport unit reside in the positioning of a shelf on the base of the work carrier for holding components placed thereon at a "kitting" station; a clear surface area at the top of a cabinet for the automatic guided vehicle for holding a tray placed thereon at the "kitting" station and having components for assembly at subsequent stations; the extension of the frame underlying the work carrier to extend for the full length thereof to provide a fixed length for the transport unit, even when the work carrier is in an elevated position as a safety precaution for coaction with a bumper on an adjacent automatic guided vehicle; the use of a palm button in circuit with a drive motor for the automatic guided vehicle located at the rear of the work carrier to permit an emergency stop of the automatic guided vehicle without requiring the attendant to move to the automatic guided vehicle; and the use of tooling associated with the work carrier which securely engages the ends of the component including the use of over-center clamps and releasable latches to assure against inadvertent release of the over-center clamps as the transport unit travels between stations and as components are being assembled thereto at each station.

An additional feature of the transport unit resides in the structure of the work carrier and tooling associated therewith. The tooling is mounted at the free ends of the legs of the U shape work carrier for rotation about an axis extending lengthwise of the work carrier and through the center of the automatic guided vehicle and with the tooling including clamp structure for engaging the ends of a component. The tooling on one leg of the work carrier is rotatable by gearing and through the rotation of the component also rotates the tooling on the other leg of the work carrier. The clamp structure is located to hold the component whereby the axis of rotation thereof is approximately at the center of gravity of the device to be assembled to facilitate rotation with minimum expenditure of power. The rotation is by means of a gearbox having a gear wheel fixed to the tooling and in mesh with a worm gear on a rotatable shaft with the shaft having opposite exposed ends for connection to a power tool at a station for driving the gearing to rotate the component or, alternatively, having a drive motor connected thereto for power rotation of the component and with the gear wheel and worm gear inherently locking the component against inadvertent rotation.

In use of the transport unit for assembling a lawn and garden tractor, a frame member, more particularly a tractor frame, can be engaged at opposite ends by the tooling with the frame member disposed generally horizontally and with wheels and associated structure mounted to the frame at one or more stations. Thereafter, the frame can be rotated 180 degrees to enable mounting of the engine, steering mechanism and other structure to the frame member. The component held by the tooling rather than being a tractor frame can be the deck of a riding mower when the latter is to be assembled.

An object of the invention is to provide a transport unit having floor-engaging wheels for use in a flexible assembly system wherein the transport unit travels selectively and sequentially between a plurality of stations and comprising, in combination: an automatic guided vehicle having said floor-engaging wheels and controllable to travel between stations, and a work carrier associated with the automatic guided vehicle for holding a component of a device to which additional components are to be assembled at a plurality of said stations; said work carrier having a U shape with a base and a pair of spaced legs each having a free end and extending from opposite ends of said base; tooling adjacent the free ends of said legs; means for mounting said tooling to said work carrier for rotation about an axis extending lengthwise of and parallel to said base and through said legs adjacent the free ends thereof; said tooling including means for engaging said component adjacent the ends thereof and constructed and arranged to hold the component for rotation about said axis and to have said axis extend approximately through the center of gravity of said device to be assembled as the center of gravity varies during the assembly process; means for moving said work carrier up and down; and means for selectively rotating said tooling relative to said work carrier and about said axis to position said component with one side facing either up or down or in any orientation therebetween.

DESCRIPTION OF THE DRAWINGS

Other objects and advantages of the present invention will be apparent from the following description, accompanying drawings and the amended claims.

FIG. 8 is a vertical section, on an enlarged scale, taken generally along the line 8—8 in FIG. 4;

FIG. 9 is a sectional view, taken generally along the line 9—9 in FIG. 8; and

DESCRIPTION OF THE PREFERRED EMBODIMENT

Figure 1:
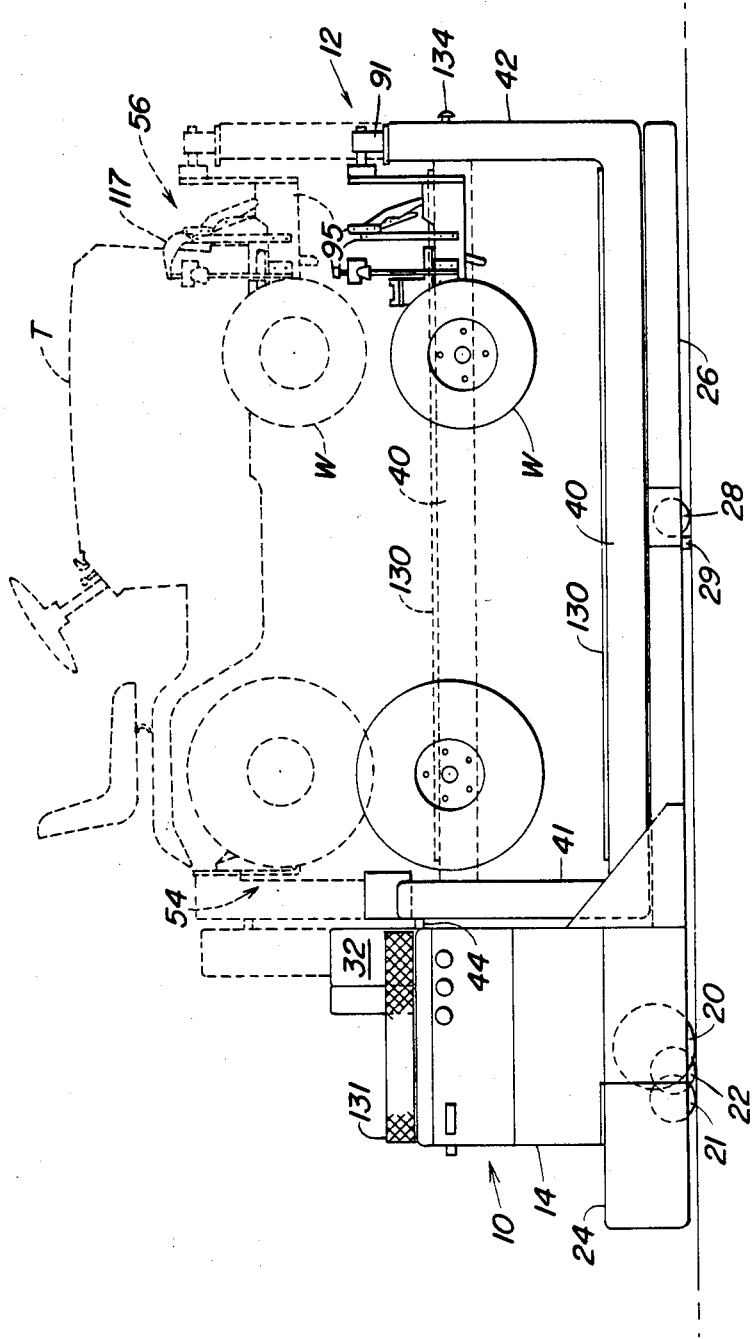
FIG. 1 is a side elevational view of the transport unit showing an assembled lawn and garden tractor and the work carrier in an elevated broken line position and with the work carrier and the wheels of the tractor shown in full line in a lowered position.
Figure 2:
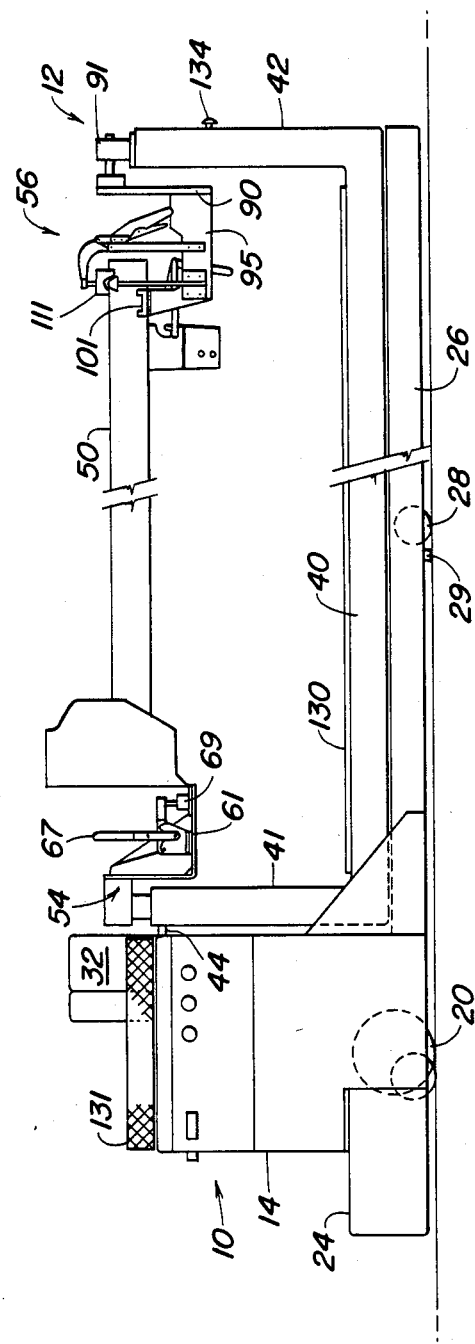
FIG. 2 is a side elevational view, similar to the full line showing in FIG. 1, and showing a tractor frame held in position prior to assembly of components thereto.
Figure 3:
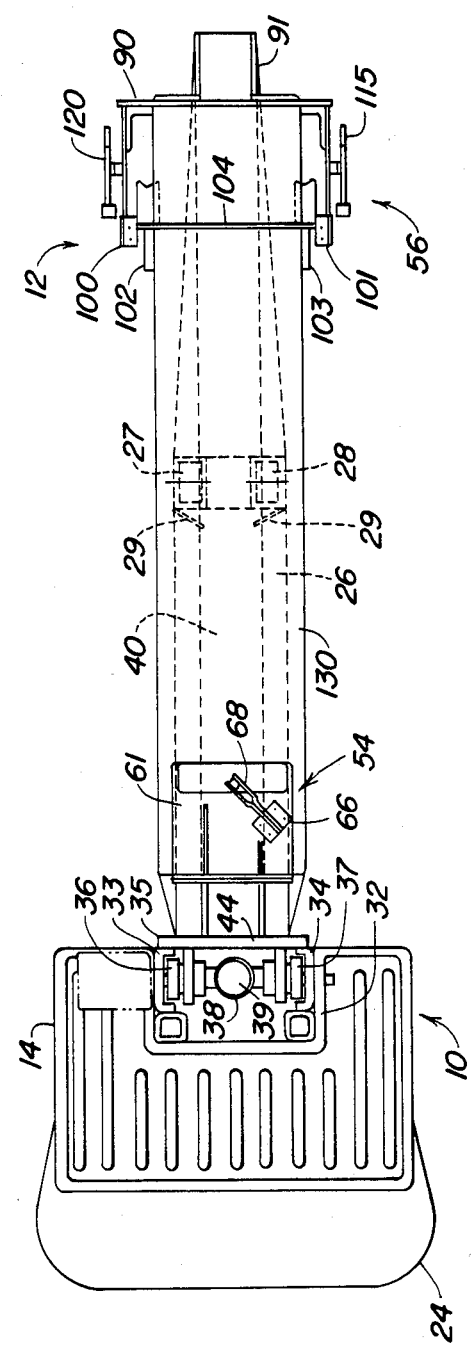
FIG. 3 is a plan view of the structure shown in FIG. 1 without any tractor component mounted to the transport unit.

The transport unit is shown generally in FIGS. 1 to 3 and comprises two major components. One of these components is an automatic guided vehicle, indicated generally at 10, and the other component is a work carrier, indicated generally at 12. The automatic guided vehicle 10 provides for controlled propulsion of the transport unit and for elevating movement of the work carrier 12. The work carrier 12 rotatably supports a component of a device to which additional components are to be assembled at a plurality of stations and with the components positionable at different elevations and a plurality of different rotative positions for ease of assembly.

The transport unit can move sequentially and selectively between a number of stations which includes an initial station wherein a component of the device to be assembled is mounted to the work carrier, subsequent assembly stations as well as "kitting" stations where parts are placed on the work carrier for assembly at a subsequent assembly station, a levelling station and a final station having a drop-off conveyor where the completed device, such as a lawn and garden tractor, can be discharged by the transport unit to a conveyor.

Figure 10:
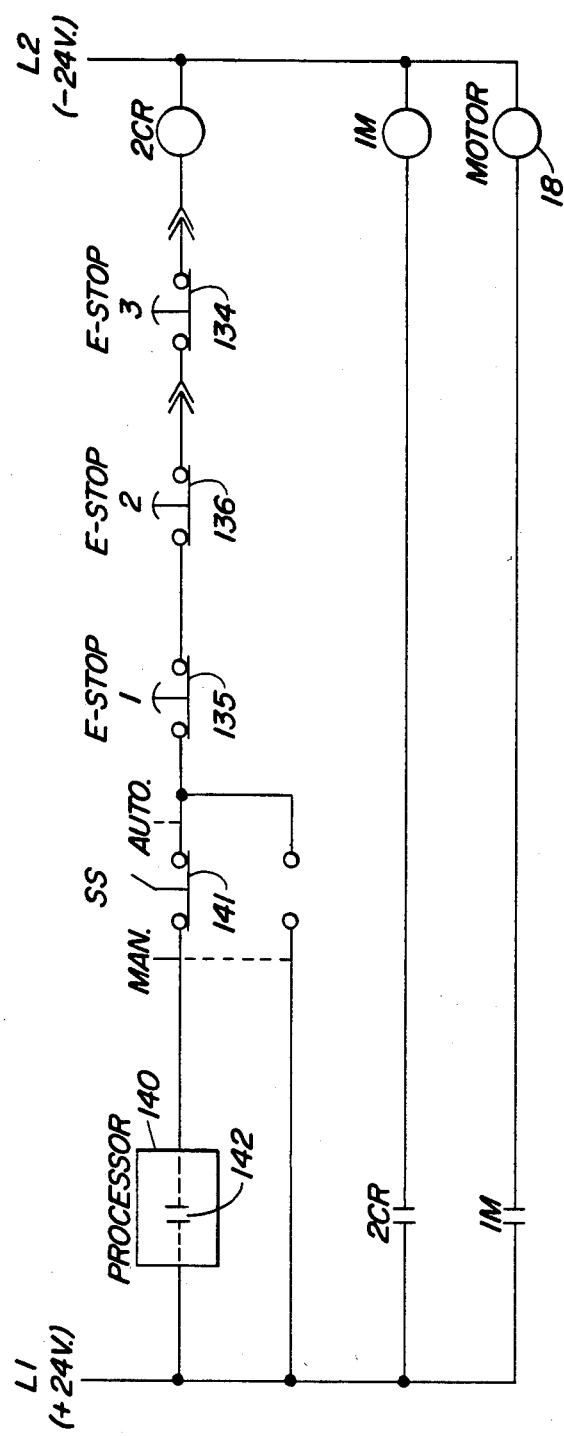
FIG. 10 is a ladder logic diagram showing the palm button control for the drive motor for the automatic guided vehicle.

The automatic guided vehicle 10 has a cabinet 14 which encloses control and drive structure responsive to a program that may either be programmed at the automatic guided vehicle or directed thereto through a floor-mounted wire or by radio command. The drive structure includes a motor 18, shown in FIG. 10, which is drivingly connected to a floor-engaging drive wheel 20 which can also be turned for steering capability, as known in the art. Additional floor support is provided by swiveling casters 21 and 22. Extending outwardly to the front of the transport unit and the automatic guided vehicle is a bumper 24 which can sense contact with an adjacent transport unit or any other object and effect stopping of the transport unit. The general structure of the drive and steering of an automatic guided vehicle is shown in the Lindfors U.S. Pat. No. 4,344,498 and the disclosure thereof is incorporated herein by reference.

A relatively narrow elongate frame is secured to and extends rearwardly from the automatic guided vehicle and extends for the full length of work carrier 12. This frame rotatably mounts a pair of floor-engaging support wheels 27 and 28 and an angled scraper-sweeper blade 29 is fixed to and extends downwardy from the frame 26 to extend across the path of the idler wheels 27 and 28 to deflect any stray items that might be on the floor and prevent their interfering with the rotation of the idler wheels which could cause a deviation in the path of travel of the transport unit. Examples of such stray items would be bolts or nuts that might fall onto a factory floor. The length of the frame 26 to fully underlie the work carrier 12 provides a fixed length for the transport unit regardless of the position of the work carrier 12 and prevents undertravel of an adjacent transport unit when the work carrier 12 is in an elevated position. The frame 26 assures contact with a bumper 24 of an adjacent transport unit to prevent the undertravel.

The automatic guided vehicle 10 has a mast structure including an outer fixed mast 32 having a pair of spaced-apart vertically-extending channels 33 and 34 (FIG. 3) which mount an inner movable mast including a vertically-extending plate 35 which rotatably mounts a pair of rollers 36 and 37 which can move along the vertically-extending channels 33 and 34 and which rigidly support the work carrier 12 in its vertical movements as well as at any selected height position. The inner movable mast mounts a ballnut 38 for coaction with a motor-driven vertically-extending ballscrew 39 fixed to the automatic guided vehicle whereby rotation of the motor rotates the ballscrew for translation of the ballnut and the mast lengthwise of the ballscrew.

The work carrier 12 has a U shape, as seen in side elevation in FIGS. 1 to 3 and has a base 40 overlying the frame 26 and a pair of spaced legs 41 and 42, each having a free end remote from the base and extending from opposite ends of the base 40. The leg 41 is a front leg and is connected to the movable mast plate 35 at 44 whereby elevation of the inner mast determines the elevation of the work carrier. Different elevations of the work carrier are illustrated in FIG. 1 wherein the work carrier shown in full line is in its lowermost position and is shown in uppermost position in broken line. These two positions are further illustrated by the showing of a lawn and garden tractor T in broken line in elevated position and with the wheels W thereof shown in full line when the work carrier is in its lowermost position.

The use of the transport unit in a flexible assembly system is illustrated in FIGS. 1 and 2, with an early stage of the assembly system being illustrated in FIG. 2 wherein a component of a device to be assembled is shown held in position on the work carrier 12. The component illustrated is a tractor frame 50 of the lawn and garden tractor T and, after travel of the transport unit through a series of stations, there is a completed lawn and garden tractor T as shown in broken line in FIG. 1. The work carrier 12, has front and rear tooling, indicated generally at 54 and 56, associated with the front leg 41 and the rear leg 42 of the work carrier, respectively, which locates and clamps opposite ends of the tractor frame 50. Means, to be described, mount the tooling 54 and 56 for rotation whereby, with the elevation capability of the work carrier, the tractor frame 50 can be located in a plurality of possible desired rotatable orientations as well as at the desired elevation to facilitate assembly operations by workmen at the various assembly stations. As an example, with the tractor frame 50 disposed as seen in FIG. 2, wheels W and associated structure can be associated with the upper side of the tractor frame 50 and, at or during travel to a subsequent station, the tractor frame 50 can be rotated through 180 degrees to place the other side of the tractor frame uppermost for assembly of an engine, steering mechanism and other components therewith and with the elevation of the tractor frame being variable for ease of assembly.

As seen in FIGS. 1 to 3, the inner mast structure is located to the rear and intermediate the sides of the cabinet 14 and has a width approximating the relatively narrow width of the frame 26 and the base 40 of the work carrier, with the base and frame extending rearwardly of the automatic guided vehicle 10. The narrow width of the base and frame enables the tractor frame 50 to extend laterally therebeyond for ease of access to a workman and the workman can stand close to the frame 26. Also, the work carrier, as well as the inner mast, can move into close association with structure at a station, particularly a bifurcated structure wherein the work carrier moves between parts of the structure at the station. Such stations can be a levelling station for a mower deck of the lawn and garden tractor, or a take-off station where the wheels of the garden tractor are lowered by the transport unit onto spaced-apart sections of a drop-off conveyor after complete assembly.

Figure 4:
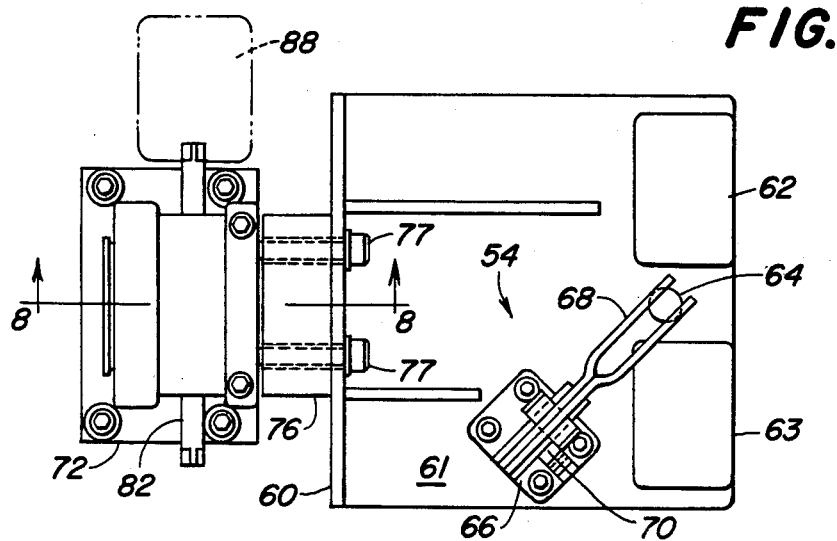
FIG. 4 is a fragmentary plan view, on an enlarged scale, of structure shown at the left-hand end of FIG. 3 and particularly of a front trunnion and tooling associated therewith.
Figure 6:
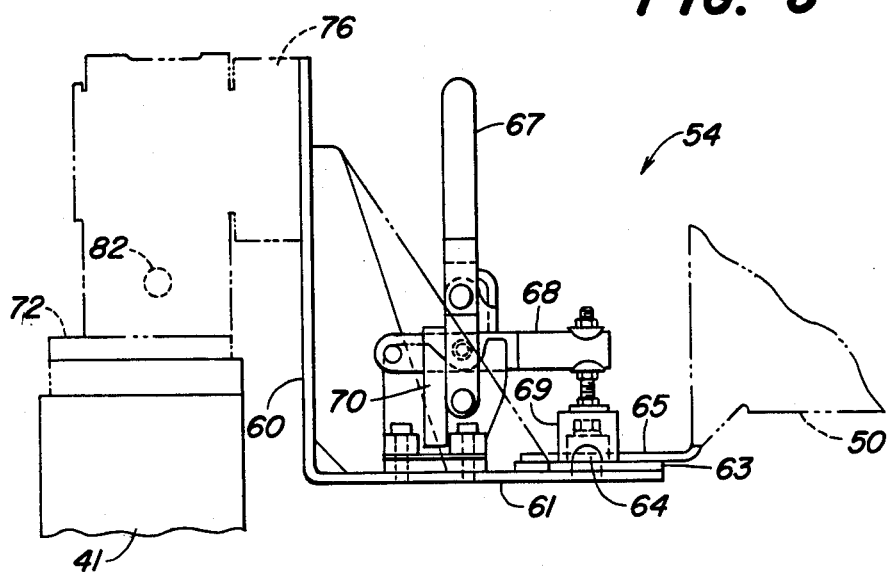
FIG. 6 is an elevational view of the structure shown in FIG. 4 and shown in association with an end of a component of the device to be assembled.

The front tooling 54 is shown particularly in FIGS. 4 and 6. This tooling includes an L-shaped base plate having a vertical section 60 and a horizontal section 61, as viewed in the Figure, with the latter section having a pair of pads 62 and 63 and a locator projection 64. An end 65 of the tractor frame 50 can rest on the pads 62 and 63, with a locator opening fitted onto the locator projection 64. A releasable over-center clamp having a base 66 is mounted to the base plate section 61 and has an operative handle 67. The over-center clamp is a commercially-available structure offered by the De-Sta-Co Division of Dover Corporation, their Model No. 247-U. An arm 68 thereof has a depending pad 69 which presses down on the end 65 of the tractor frame 50 when the over-center clamp is in closed position. In order to avoid inadvertent release of the over-center clamp, a manually releasable pivoted spring-urged latch 70 is pivoted on the base 66 and engages a link of the over-center clamp when the clamp is closed to prevent inadvertent release thereof both as the transport unit travels between stations and while assembly work is being performed thereon while stopped at an assembly station.

Means for rotating the tool 54 and 56 and the components held thereby are associated with the front tooling 54 and shown particularly in FIGS. 4, 6, 8 and 9.

The structure includes a trunnion and a gearbox having a base plate 72 which is fastened to the upper end of the front leg 41 of the work carrier. The gearbox has a pair of spaced-apart apertured bearing members 73 and 74 which rotatably mount a gear wheel 76. The gear wheel is attached to the vertical section 60 of the tooling base plate by threaded members 77 whereby rotation of the gear wheel results in rotation of the front tooling 54. The gear wheel 76 has an external annular gear 78 which meshes with a worm gear 80 on an elongate shaft 82 which is rotatably supported in a pair of thrust bearings 83 and 84 positioned by bearing blocks 85 and 86. As seen particularly in FIGS. 3 and 9, the shaft 82 extends at both ends outwardly of the gearbox to extend to opposite sides of the work carrier 12 whereby a workman may utilize a wrench manually or connect a power tool, such as an air driven motor to either end of the shaft at an assembly station to rotate the shaft and the worm gear 80 with resulting rotation of the gear wheel 76 to rotate the front tooling 54. Alternatively, one end of the shaft may have a motor drivingly connected thereto, such as a motor 88 shown diagrammatically in FIG. 4 whereby energization of the motor will rotate the shaft 82.

The external annular gear 78 on the gear wheel 76 and the worm gear 80 are designed to provide a lock against rotation of the gear wheel 76 and the tooling except when the shaft 82 is rotated whereby the component can be held in a desired rotative position.

Figure 5:
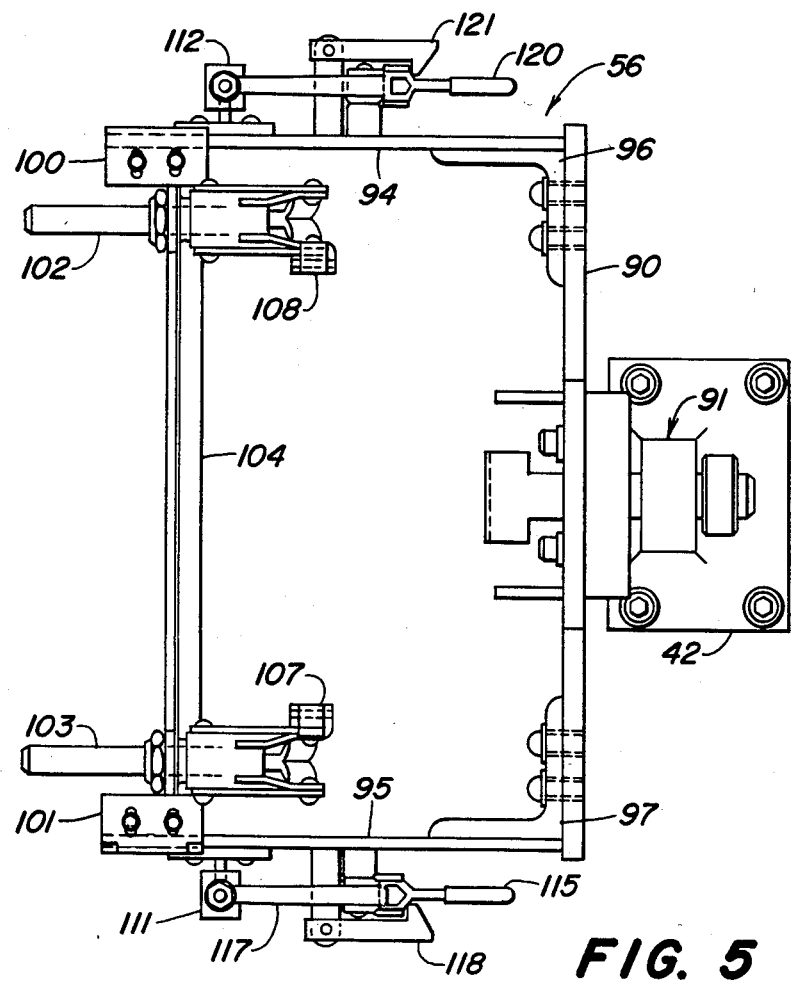
FIG. 5 is a fragmentary plan view, on an enlarged scale, of a rear trunnion and tooling shown at the right-hand end of FIG. 3.
Figure 7:
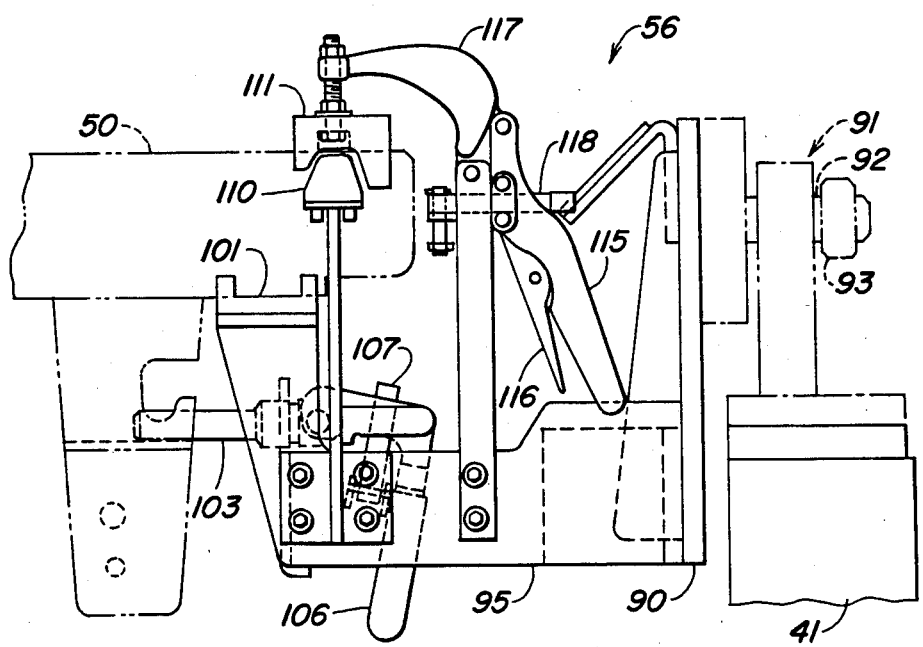
FIG. 7 is an elevational view of the structure shown in FIG. 5 and shown in association with an end of a component of the device to be assembled.

The rear tooling 56 is shown particularly in FIGS. 5 and 7, with the latter Figure showing the rear tooling holding an end of the tractor frame 50.

The rear tooling 56 has a vertical plate 90 rotatably connected to an upper end of the rear leg 42 of the work carrier by a trunnion, indicated at 91. There is no drive structure associated with the rear tooling 56, with rotation thereof being derived from the front tooling and the connection thereof to the rear tooling through the tractor frame 50. The front and rear tooling rotate about an axis extending lengthwise and parallel to the base 40 of the work carrier and generally in line with the center line of the automatic guided vehicle. The axis extends closely adjacent to the center of gravity of the lawn and garden tractor as the center of gravity varies during the assembly process to minimize the power required in rotating the tooling during the assembly process.

The vertical plate 90 has a pair of forwardly-extending side plates 94 and 95 secured thereto by angle irons 96 and 97, respectively, and with the side plates mounting alternately usable locating and clamping structure.

When the component to be held by the rear tooling is the tractor frame 50, an end of the frame rests upon a pair of abutments 100 and 101 which are formed at the upper ends of a pair of arms fixed to the side plates 94 and 95, respectively. This engagement is maintained by a pair of extensible rods 102 and 103 which are movably mounted in a transverse member 104 extending between the side plates 94 and 95. The extensible rods can move from an extended position, shown in FIGS. 5 and 7, to a retracted position by movement toward the right, as viewed in the Figures. These rods engage surfaces on the tractor frame 50 and, as seen in FIG. 7, act to maintain the engagement of the tractor frame with the abutments 100 and 101. These extensible rods 102 and 103 are components of over-center actuators which are commercially available units, Model 624 of the De-Sta-Co Division of Dover Corporation. These actuators rely on positioning by movement of a handle, such as the handle 106 associated with the extensible rod 103 and, when the rod is extended, the actuator is in a locked position. In order to assure against inadvertent release of the actuator, each of the actuators has a manually-releasable spring-urged pivoted latch, such as the latch 107, shown in FIG. 7, associated with one actuator and a latch 108 associated with the other whereby a link of the actuator is held against movement until the latch is manually released.

An alternate structure for holding a component when such component is, for example, a rider frame of a rider lawn mower, rather than the tractor frame of a lawn and garden tractor, has a pair of locating abutments outboard of the abutments 100 and 101 against which a portion of the rider deck may engage. Each of the abutments has an over-center clamp structure associated therewith for clamping down on the rider deck opposite the abutment. One of these abutments is shown at 110 in FIG. 7, with a hold-down member shown at 111. The other structure is shown in FIG. 5 having a hold-down member 112. Each of these hold-down members is carried by an over-center clamp structure and, in a commercial embodiment, such clamp structure is a Model 345 over-center clamp structure of the De-Sta-Co Division of Dover Corporation. This clamp structure has a grip with a trigger release 116 and a pivoted clamp member 117 holding the hold-down member 111. Again, to assure against release of the over-center linkage of the clamp structure, a manually-releasable spring-urged latch member 118 is positioned to hold the clamp structure in clamped position. Similar structure for the hold-down member 112 is shown in FIG. 5, including a grip 120 and a manually-releasable latch member 121. The front tooling 54, as shown, can hold an end of a rider frame.

The front 54 and rear 56 tooling design is flexible enough to allow assembly of a plurality of different vehicles having different frames thereon by simply adjusting the position of the various over-center actuators or over-center clamps thereby repositioning them on the rear tooling 56. This may be accomplished by drilling additional holes in the fixture to mount the tooling in different locations or by providing elongated slots in the fixtures for mounting the tooling in a plurality of locations. Tooling plate 90 can also be adjusted to accommodate various frame lengths by adjusting a shaft 92, having a collar 93 at an end thereof, relative to trunnion 91 to position vertical plate 90 relative to front tooling 54. This enables a single transport unit to be utilized for assembling a plurality of different vehicles by making minimum adjustments to its tooling.

The transport unit can move between a plurality of assembly stations and, additionally, there can be one or more "kitting" stations where components to be subsequently assembled are placed on the transport unit for travel therewith to the next assembly station. Facilitating this transport of components to an assembly station is a shelf 130 fixed to the upper side of the base 40 of the work carrier which, as seen in FIG. 3, is of sufficient width to hold components. Additionally, a major part of the top of the cabinet 14 of the automatic guided vehicle is free of obstruction, again as seen in FIG. 3, and a tray 131 which has had parts positioned therein can be placed on the top of the cabinet at a "kitting" station.

It is conventional to mount one or more palm buttons on a automatic guided vehicle to provide for emergency stopping in the event that there is a failure in the control, or for any other reason. With the work carrier 12 extending a substantial distance rearwardly from the automatic guided vehicle, it may not be possible to reach such palm buttons in sufficient time to provide the necessary stopping of the transport unit. Accordingly, the rear leg 42 of the work carrier has a palm button 134 which may be depressed manually to stop the drive to the drive wheel 20 of the automatic guided vehicle. The palm button 134 is shown in association, in FIG. 10, with a pair of palm buttons 135 and 136, which are mounted on the automatic guided vehicle. In this ladder logic diagram, the lines L1 and L2 represent a source of voltage and the palm buttons are in series across the lines and with the processor 140, a selector switch 141 and a control relay 2CR. If the selector switch 141 is in the Auto position, as shown, the control relay 2CR is energized if the processor has completed the circuit. For illustrative purposes only, the processor is shown as having a contact 142 for completing the circuit. If the relay 2CR is energized, its corresponding contact 2CR is closed, thereby energizing the motor starter 1M and closing contact 1M to energize the motor 18. If any of the three palm buttons 134-136 are pressed, relay 2CR is deenergized and contact 2CR opens, with regulating deenergization of the motor-starter 1M opening contact 1M, and the motor 18 stops. If the selector switch 141 is in the off position, the control relay 2CR cannot be energized and the motor remains off. If selector switch 141 is in the manual position, the control relay 2CR is energized, with the same resulting operation as in the AUTO position. It will be obvious that the motor 18 may operate off of a different voltage source than the control relay and that the motor may have overload protection.

While the form of apparatus herein described constitutes a preferred embodiment of this invention, it is to be understood that the invention is not limited to this particular form of apparatus and that changes may be made therein without departing from the scope of the invention which is defined in the appended claims.

We claim:

1. A transport unit having floor-engaging wheels for use in a flexible assembly system wherein the transport unit travels selectively and sequentially between a plurality of stations and comprising, in combination:
   an automatic guided vehicle having said floor-engaging wheels and controllable to travel between stations, and a work carrier associated with the automatic guided vehicle for holding a component of a device to which additional components are to be assembled at a plurality of said stations;
   said work carrier having a U shape with a base and a pair of spaced legs each having a free end and extending from opposite ends of said base;
   tooling adjacent the free ends of said legs;
   means for mounting said tooling to said work carrier for rotation about an axis extending lengthwise of and parallel to said base and through said legs adjacent the free ends thereof;
   said tooling including means for engaging said component adjacent the ends thereof and constructed and arranged to hold the component for rotation about said axis and to have said axis extend approximately through the center of gravity of said device to be assembled;
   means connected to one of said legs at least adjacent its said free end for moving said work carrier up and down;
   and means, operatively connected to said means for mounting said tooling for rotation, for selectively rotating said tooling relative to said work carrier and about said axis to position said component with one side facing either up or down or in any orientation therebetween.

2. A transport unit as defined in claim 1 wherein the means for moving the work carrier up and down includes a mast, means movably mounting said mast on the automatic guided vehicle at the rear and intermediate the sides thereof, means connecting said mast to a leg of the work carrier adjacent an upper end of said leg, and the means mounting the tooling for rotation includes a trunnion interconnecting the tooling and one of the legs of said work carrier.

3. A transport unit as defined in claim 2, wherein said means for selectively rotating said tooling comprises a worm gear drive including a worm gear, a shaft mounting said worm gear, and said shaft extending outwardly from both sides of said worm gear and work carrier for connection to a power source.

4. A transport unit as defined in claim 2 wherein said means for selectively rotating said tooling comprises a worm gear drive including a worm gear, a shaft mounting said worm gear, and a motor connected to said shaft.

5. A transport unit as defined in claim 1 wherein said automatic guided vehicle has a frame extending to the rear thereof underlying the entire length of said work carrier base to define a fixed overall length for the transport unit at the floor level even when the work carrier is elevated.

6. A transport unit as defined in claim 1 wherein said automatic guided vehicle has a cabinet and a frame extending rearwardly thereof immediately above floor level, and said work carrier and said frame have a width substantially less than the width of said cabinet and the width of said component to permit close access to said component at said stations and to enable said work carrier to move into a station having a bifurcated structure at a station such as a take-away conveyor or the like.

7. A transport unit as defined in claim 6 wherein the means for moving the work carrier up and down includes a mast movably mounted on the automatic guided vehicle, said mast being mounted between the sides of the cabinet and having a substantially lesser width than the cabinet whereby said mast, when raised above the cabinet, can move between a bifurcated structure along with said frame and said work carrier.

8. A transport unit as defined in claim 6 including a shelf fixed to the upper side of the work carrier base and of a width greater than the base for support of one or more components deposited thereon at a "kitting" station and which are to be assembled at an assembly station.

9. A transport unit as defined in claim 6 wherein said automatic guided vehicle cabinet has a top area which is generally flat and free of structure, and a tray positionable on said top area at a "kitting" station for holding components to be subsequently assembled.

10. A transport unit as defined in claim 1 wherein said automatic guided vehicle has a drive motor, and means including a manually operable palm button mounted on the leg of the work carrier farthest from the automatic guided vehicle for deenergizing said motor.

11. A transport unit as defined in claim 1 wherein said tooling engaging means associated with one of said legs includes a plate with a locator projection to fit in an opening at an end of said component, and a releasable over-center pivotal clamp for engaging the component and holding the latter in association with the locator projection.

12. A transport unit as defined in claim 11 including a releasable latch to hold the over-center clamp against inadvertent release.

13. A transport unit as defined in claim 1 wherein said tooling engaging means associated with one of said legs includes alternately usable structure with one structure including abutments on which an end of the component may rest, a pair of extensible rods engageable with the component to hold the latter on the abutments, and a pair of over-center actuators for said rods.

14. A transport unit as defined in claim 13 wherein said tooling engaging means is adjustable to accommodate a plurality of different components.

15. A transport unit as defined in claim 13 including releasable latch means to hold said actuators against inadvertent release.

16. A transport unit as defined in claim 13 wherein the other of said alternately usable structures includes a pair of supports for engaging the underside of the component, and a pair of over-center clamps engageable with the component to hold the latter on the supports.

17. A transport unit as defined in claim 16 including releasable latch means associated with the over-center clamps to hold said over-center clamps against inadvertent release.

18. A transport unit as defined in claim 1 wherein the means mounting the tooling for rotation comprises, a front trunnion associated with a front one of said work carrier legs and a rear trunnion associated with a rear one of the work carrier legs, said front trunnion having a gear wheel fixed to the tooling associated with the front leg, a pair of apertured bearings fixed to the front leg and rotatably mounting the gear wheel, and said means for selectively rotating said tooling includes said gear wheel, a worm gear in mesh with said gear wheel and a shaft mounting said worm gear and having exposed ends for engagement at either end by a power tool located at a station, said gear wheel and worm gear being operable to hold the work carrier in the desired orientation.

19. A transport unit having floor-engaging wheels for use in a flexible assembly system for a plurality of different models of lawn and garden vehicles wherein the transport unit travels selectively and sequentially between a plurality of stations and comprising, in combination:
   an automatic guided vehicle having said floor-engaging wheels and controllable to travel between stations;
   a work carrier having a U shape with a base and a pair of spaced legs each having a free end and extending upwardly from opposite ends of said base associated with the automatic guided vehicle for holding a frame member of a selected one of said tractors to which additional components are to be assembled at a plurality of said stations;
   tooling adjacent the free ends of said legs;
   means, including a rotatable member, for mounting said tooling to said work carrier for rotation about an axis extending lengthwise of and parallel to said base and through said legs adjacent the free ends thereof;
   means operatively connected to said tooling for engaging said frame member adjacent the ends thereof and constructed and arranged to hold the frame member for selective rotation about said axis and to have said axis extend approximately through the center of gravity of said selected lawn and garden tractor;
   means, operatively connected to said automatic guided vehicle and to one of said legs of at least said work carrier adjacent its said free end, for selectively vertically adjusting said work carrier;
   and means, connected to said rotatable member, for selectively rotating said tooling relative to said work carrier and about said axis to position said frame member with one side facing up for assembly of wheel structures and with said frame member facing down for assembly of an engine and other structure therewith and with the frame member at variable heights for ease of assembly by a workman.

20. A transport unit as defined in claim 18 wherein the means on the automatic guided vehicle for moving the work carrier up and down includes a mast, and the means mounting the tooling for rotation includes a tunnion interconnecting an upper end of said mast and a upper end of one of the legs of said work carrier.

21. A transport unit as defined in claim 19 wherein said means for selectively rotating said tooling comprises a worm gear drive including a worm gear, a shaft mounting said worm gear, and said shaft extending outwardly from both sides of said worm gear and work carrier for connection to a power source.

22. A transport unit as defined in claim 19 wherein said means for selectively rotating said tooling comprises a worm gear drive including a worm gear, a shaft mounting said worm gear, and a motor connected to said shaft.

23. A transport unit as defined in claim 18 wherein said automatic guided vehicle has a frame extending to the rear thereof underlying the entire length of said work carrier base to define a fixed overall length for the transport unit at the floor level even when the work carrier is elevated and prevents undertravel of an adjacent transport unit.

24. A transport unit having floor-engaging wheels for use in a flexible assembly system wherein the transport unit travels selectively and sequentially between a plurality of stations and comprising, in combination:
   an automatic guided vehicle having said floor-engaging wheels and uncontrollable to travel between stations;
   a work carrier having a U shape with a base and a pair of spaced legs each having a free end and extending from opposite ends of said base associated with the automatic guided vehicle for holding a component of a device to which additional components are to be assembled at a plurality of said stations;
   tooling adjacent the free ends of said legs;
   means for mounting said tooling to said work carrier for selective 360 degree rotation about an axis extending lengthwise of and parallel to said base and through said legs adjacent the free ends thereof; and
   means for selectively moving said work carrier up and down.

25. A transport unit as defined in claim 23 wherein said tooling further comprises: means for engaging said component adjacent the ends thereof and constructed and arranged to hold the component for rotation about said axis and to have said axis extend approximately through the center of gravity of said device to be assembled.

26. The transport unit of claim 24 further comprising: means for selectively rotating said tooling relative to said work carrier and about said axis to position said component with one side facing either up or down or in any orientation therebetween.

27. A transport unit as defined in claim 23 wherein the means for moving the work carrier up and down includes a mast, means movably mounting said mast on the automatic guided vehicle at the rear and intermediate the sides thereof, means connecting said mast to a leg of the work carrier, and the means mounting the tooling for rotation includes a trunnion interconnecting the tooling and one of the legs of said work carrier.

28. A transport unit having floor-engaging wheels for use in a flexible assembly system wherein the transport unit travels selectively and sequentially between a plurality of stations, said transport unit comprising:
an automatic guided vehicle having said floor-engaging wheels and controllable to travel between stations;
means, operatively connected to said vehicle, for supporting a component of a device to which a plurality of additional components are to be assembled at a plurality of said stations, said means having a base and a pair of spaced legs, each having a free end extending from opposite ends of said base, said means having a U-shape;
tooling means, operatively connected to said supporting means, for securing said first component to said supporting means;
means, operatively connected to said supporting means, for mounting said tooling means to said supporting means for 360° rotation about an axis extending lengthwise of and parallel to said base and through said legs adjacent said free ends thereof;
means, operatively connected to said supporting means, for selectively moving said supporting means up and down; and
means, operatively connected to said tooling means, for selectively rotating said tooling means relative to said supporting means and about said axis to a plurality of positions such that said additional components may be operatively connected to said first component when said first component is positioned in any one of a plurality of said rotated positions.

29. A transport unit having floor-engaging wheels for use in a flexible assembly system wherein the transport unit travels selectively and sequentially between a plurality of stations and comprising:
an automatic guided vehicle having said floor-engaging wheels and controllable to travel between stations;
a work carrier carried by the automatic guided vehicle for holding a component of a device to which additional components are to be assembled at a plurality of said stations, said work carrier having a U shape and of unitary construction with an elongate narrow base extending lengthwise of the transport unit and a pair of spaced legs extending at right angles from opposite ends of said base and each having a free end remote from said base;
tooling means adjacent the free ends of said legs for releasably engaging said component adjacent opposite ends thereof with the component extending lengthwise of said base;
means for mounting said tooling means to said work carrier for rotation about an axis extending in spaced parallel relation to said base and through said legs adjacent the free ends thereof;
vertically movable means on the automatic guided vehicle connected to one of said legs adjacent the free end thereof for mounting the work carrier for up and down movement with said means being substantially within the automatic guided vehicle when the work carrier is in a lowermost position and extendable upwardly from the automatic guided vehicle when the work carrier is elevated;
means for moving said vertically movable means to locate said work carrier at a height wherein the component will be at a desired elevation;
means for selectively rotating said tooling means about said axis to rotate said component to achieve the desired rotative orientation thereof;
a full length narrow frame extending from the automatic guided vehicle for the full length of said work carrier to establish a constant overall length for the transport unit regardless of the elevated position of the work carrier; and
at least one floor-engaging wheel on said frame.

30. A transport unit having floor-engaging wheels for use as a movable assembly platform wherein the transport unit travels between a plurality of stations, said transport unit comprising:
an automatic guided vehicle having said floor-engaging wheels, said vehicle being controlled to travel between said stations;
a work carrier, operatively connected to said vehicle, for supporting at least one initial component to which at least one additional component is assembled thereto at said stations, said work carrier having a single base and a pair of spaced legs operatively connected to opposite ends of said base, said work carrier having a U-configuration;
tooling means, operatively connected to the end of each of said spaced legs, for securing said initial component to said work carrier;
rotational means, operatively connected to said tooling means, for rotating said initial component in either direction about an axis, said axis extending lengthwise of and parallel to said work carrier base and through the ends of said spaced apart legs, said rotational means being operative to allow rotation of said initial component 360° in either direction when no element of said initial component exceeds the distance between said axis and said base; and
means, operatively connected to said work carrier, for selectively vertically adjusting said work carrier relative to said automatic guided vehicle.

31. The transport unit of claim 30 wherein said selective vertical adjusting means comprises:
a mast unit having a top and a bottom, operatively connected to said automatic guided vehicle and said work carrier, for selectively positioning said axis relative said automatic guided vehicle, the distance from the top of said mast to said base of said work carrier always remaining constant while the distance from the top of said mast to the bottom of said mast varies according to the relative height of said work carrier in relation to said automatic guided vehicle.

32. The transport unit of claim 31 wherein said mast top extends only slightly above the top of said automatic guided vehicle when said work carrier is in a lowered position and extends relatively higher above said automatic guided vehicle when said work carrier is in a raised position.

33. The transport unit of claim 30 wherein said automatic guided vehicle further comprises:
- a base member extending from the rear of said automatic guided vehicle, said base member extending the entire length of said work carrier base; and
- a contact actuated bumper extending from the front of said automatic guided vehicle wherein contact between said bumper of a first automatic guided vehicle and said base member of a second automatic guided vehicle having its work carrier elevated is operative to prevent under travel of said first automatic guided vehicle by said second automatic guided vehicle.

34. A transport unit as defined in claim 20, wherein said mast does not extend more than a constant distance above said work carrier base when said work carrier is moved up and down.

* * * * *

UNITED STATES PATENT AND TRADEMARK OFFICE
CERTIFICATE OF CORRECTION

PATENT NO. : 4,787,801

DATED : Nov. 29, 1988

INVENTOR(S) : Ahlsén et al.

It is certified that error appears in the above-identified patent and that said Letters Patent is hereby corrected as shown below:

On The Title Page, Item [73] should read

-- [73] Assignees: Deere & Company, Moline, Ill. and Conco-Tellus Inc. --.

Signed and Sealed this

Twenty-sixth Day of September, 1989

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,787,801
DATED : 29 November 1988
INVENTOR(S) : Bertil J. B. Ahlsen et al.

It is certified that error appears in the above-identified patent and that said Letters Patent is hereby corrected as shown below:

Column 12, line 21, delete "tunnion" and insert therefor -- trunnion -- .

Signed and Sealed this

Twenty-first Day of November, 1989

*Attest:*

JEFFREY M. SAMUELS

*Attesting Officer*   *Acting Commissioner of Patents and Trademarks*